(12) United States Patent
Temelkuran et al.

(10) Patent No.: US 12,011,869 B2
(45) Date of Patent: Jun. 18, 2024

(54) METHOD AND PREFORM FOR FORMING A DEVICE COMPRISING A SHAPE MEMORY POLYMER

(71) Applicant: IP2IPO Innovations Limited, London (GB)

(72) Inventors: Burak Temelkuran, London (GB); Mohamed E M K Abdelaziz, London (GB); Guang-Zhong Yang, London (GB); Anzhu Gao, London (GB)

(73) Assignee: IP2IPO Innovations Limited, London (GB)

( * ) Notice: Subject to any disclaimer, the term of this patent is extended or adjusted under 35 U.S.C. 154(b) by 101 days.

(21) Appl. No.: 17/434,636

(22) PCT Filed: Feb. 27, 2020

(86) PCT No.: PCT/GB2020/050477
§ 371 (c)(1),
(2) Date: Aug. 27, 2021

(87) PCT Pub. No.: WO2020/174248
PCT Pub. Date: Sep. 3, 2020

(65) Prior Publication Data
US 2022/0168946 A1 Jun. 2, 2022

(30) Foreign Application Priority Data
Feb. 28, 2019 (GB) ...................... 1902734

(51) Int. Cl.
*B29C 61/08* (2006.01)
*B29C 53/60* (2006.01)
(Continued)

(52) U.S. Cl.
CPC .............. *B29C 61/08* (2013.01); *B29C 53/60* (2013.01); *B29C 55/005* (2013.01); *B29C 55/22* (2013.01);
(Continued)

(58) Field of Classification Search
CPC .................................. D01D 1/04; D01D 5/24
See application file for complete search history.

(56) References Cited

U.S. PATENT DOCUMENTS 4,757,675 A * 7/1988 Oglesby ............... G02B 6/4407
57/6
6,720,402 B2 4/2004 Langer
(Continued)

FOREIGN PATENT DOCUMENTS

CN 1106743 A 8/1995
CN 104884509 A 9/2015
(Continued)

OTHER PUBLICATIONS

"Deflectable & Steerable Catheter Handbook", Creganna Tactx Medical.
(Continued)

*Primary Examiner* — Jeffrey M Wollschlager
(74) *Attorney, Agent, or Firm* — PABST PATENT GROUP LLP (57) ABSTRACT

There is provided herein a method of manufacturing a device comprising at least a first fibre using a draw apparatus, the method comprising: providing a first preform comprising a shape memory polymer to the draw apparatus; heating a first portion of the first preform; and drawing, using the draw apparatus, the heated first portion in order to form the first fibre.

17 Claims, 5 Drawing Sheets

(51) Int. Cl.
    *B29C 55/00*    (2006.01)
    *B29C 55/22*    (2006.01)
    *B29K 101/00*   (2006.01)
    *B29K 105/00*   (2006.01)

(52) U.S. Cl.
    CPC .... *B29K 2101/00* (2013.01); *B29K 2105/253* (2013.01)

(56) References Cited

U.S. PATENT DOCUMENTS

| | | | |
|---|---|---|---|
| 10,040,880 B2* | 8/2018 | Behl | C08F 210/02 |
| 10,299,520 B1* | 5/2019 | Shaffer | A61B 5/6804 |
| 2004/0197061 A1 | 10/2004 | Ogura | |
| 2008/0087047 A1* | 4/2008 | Bayindir | B29D 11/00663 |
| | | | 257/E31.093 |
| 2008/0205840 A1* | 8/2008 | Wakabayashi | G02B 6/08 |
| | | | 264/1.24 |
| 2010/0292374 A1* | 11/2010 | Bellare | B29C 71/0072 |
| | | | 524/323 |
| 2010/0305676 A1 | 12/2010 | Dadd | |
| 2012/0000251 A1* | 1/2012 | Hu | C08G 18/4238 |
| | | | 139/384 R |
| 2015/0123314 A1* | 5/2015 | Brown | A61B 17/866 |
| | | | 264/319 |
| 2016/0032501 A1* | 2/2016 | Baychar | D04B 1/16 |
| | | | 442/194 |
| 2017/0306539 A1* | 10/2017 | Gladish | D04H 1/76 |
| 2018/0039036 A1 | 2/2018 | Fink | |
| 2018/0087189 A1* | 3/2018 | Wetzel | B29C 64/106 |
| 2019/0004724 A1 | 1/2019 | Kanno | |
| 2019/0047240 A1* | 2/2019 | Sorin | G02B 1/045 |
| 2021/0170633 A1* | 6/2021 | Yuasa | B29B 11/10 |

FOREIGN PATENT DOCUMENTS

| | | |
|---|---|---|
| EP | 0654284 | 5/1995 |
| JP | 1996(H08)-72143 A | 3/1996 |
| JP | 1999(H11)-192662 A | 7/1999 |
| JP | 1999(H11)-195524 A | 7/1999 |
| JP | 2001-62915 A | 3/2001 |
| JP | 2017-52949 A | 3/2017 |
| WO | 2017085323 | 5/2017 |

OTHER PUBLICATIONS

Chautems, et al., "A Variable Stiffness Catheter Controlled with an External Magnetic Field", 2017 IEEE/RSJ International Conference on Intelligent Robots and Systems (IROS): 181-186 (2017).

He, et al., "A linear stepping endovascular intervention robot with variable stiffness and force sensing", Int. J. CARS, 13(5):671-682 (2018).

International Preliminary Report on Patentability and Written Opinion for PCT/GB2020/050477 dated Sep. 10, 2021.

Jayakumar, et al., "Experimental and CFD estimation of heat transfer in helically coiled heat exchangers", Chem. Eng. Res. and Des., 86:221-232 (2008).

Kanik, et al., "Spontaneous High Piezoelectricity in Poly(vinylidene fluoride) Nanoribbons Produced by Iterative Thermal Size Reduction Technique", ACS Nano, 8(9): 9311-9323 (2014).

Khudiyev, et al., "Sub-Micrometer surface-patterned ribbon fibers and textiles", Adv. Mater., 29(22):1-39 (2017).

Latt, et al., "A Hand-held Instrument to Maintain Steady Tissue Contact during Probe-Based Confocal Laser Endomicroscopy", IEEE Transaction on Biomedical Engineering, 58(9): 2694-2703 (2011).

Lendlein, et al., "Shape-Memory Polymers", Agnew. Chem. Int. Ed., 41(12):2034-2057 (2002).

Nguyen, et al., "Tailoring Surface Properties of Fiber Materials: Novel Opportunities in the Fabrication of Multi-scale Fiber-based Architectures", Thèse No. 7645, Apr. 28, 2017.

Qu, et al., "Superelastic Multimaterial Electronic and Photonic Fibers and Devices via Thermal Drawing", Adv. Mater., 30(1707251):1-8 (2018).

Schmidt, et al., "Studies on the cycling, processing and programming of an industrially applicable shape memory polymer Tecoflex® (or TFX EG 72D)", High Performance Polymers, 300-307 (2011).

Search and Examination Report for GB10902734.1 dated Oct. 4, 2019.

Sorin, "Multimaterial Multifunctional Fiber Devices", 2009 35th European Conference on Optical Communication: 1-4 (2009).

Wang, et al., "Robotic Scanning Device for Intraoperative Thyroid Gland Endomicroscopy", Annals of Biomedical Engineering, 46(4): 543-554 (2018).

Yan, et al., "Reversible Actuation of Thermoplastic Multiblock Copolymers with Overlapping Thermal Transitions of Crystalline and Glassy Domains", Macromolecules, 51 (12):4624-4632 (2018).

Zhang, et al., "From Macro to Micro: Autonomous Multiscale Image Fusion for Robotic Surgery", IEEE Robotics & Automation Magazine, 24(2): 63-72 (2017).

International Search Report for PCT/GB2020/050477 dated Jun. 3, 2020.

* cited by examiner

METHOD AND PREFORM FOR FORMING A DEVICE COMPRISING A SHAPE MEMORY POLYMER

CROSS-REFERENCE TO RELATED APPLICATIONS

This application is a National Phase application under 35 U.S.C. 371 of PCT/GB2020/050477, filed Feb. 27, 2020, and claims the benefit of and priority to G.B. Application No. 1902734.1, filed Feb. 28, 2019, the disclosures of which are hereby incorporated herein by reference in their entirety.

The present application relates generally to a method for forming a device comprising a shape memory polymer by way of a fibre drawing technique and a preform for accomplishing the same.

Preforms described herein are blocks of material, often polymer material, from which fibres can be drawn. Preforms have a larger transverse cross-sectional area than the fibres which are drawn from them and the resultant fibre which can be drawn from a single preform can be, for example, one thousand times longer than the original preform. During the drawing of a fibre from a preform, the structure shrinks in the transverse direction of the preform and is elongated in the longitudinal direction (the draw direction). As such, the precise structure of the preform in terms of its composition, its shape, its size and any other features has a significant impact on the resulting fibre.

A preform generally comprises a substantially cylindrical structure, although a preform may comprise any shape. A longitudinal direction, also referred to herein as the draw direction, can be defined as extending through the length of the preform in the direction along which a fibre would be drawn. A radial direction can be defined as extending radially outwards from, and perpendicular to, the longitudinal axis. A radial velocity will be understood to mean a velocity of rotation of the preform or fibre around the longitudinal axis, resulting in spinning of at least part of the preform as it is drawn into a fibre.

The present application is concerned with the forming of fibres from preforms comprising shape memory polymer materials by a draw process using a draw apparatus such as a draw tower. It will be appreciated, thereby, that the shape memory polymers referred to in the present application will refer specifically to shape memory polymers which are suitable for drawing into a fibre, i.e. drawable shape memory polymers. In some examples, for a shape memory polymer to be considered suitable for drawing into a fibre, the shape memory polymer should have a viscosity lower than about $10^7$ Pascal second ($10^8$ Poise) at a selected draw temperature, with a viscosity of, preferably, between about $10^3$ Pascal second ($10^4$ Poise) and about $10^6$ Pascal second ($10^7$ Poise), all when measured at the selected draw temperature. It will be appreciated that any material for drawing into a fibre, such as a shape memory polymer, should retain both its structural integrity and its chemical composition at the draw temperature. Examples of non-shape memory polymer materials which may also provide for at least a portion of a preform and a resultant fibre may include silica or any other glassy material such as borosilicate glass, chalcogenide glass, or other suitable glassy material. Other examples include: polystyrene (PS), poly methyl methacrylate (PMMA), acrylonitrile butadiene styrene (ABS), polycarbonate (PC), cyclic olefin copolymer (COC), polycarbonate alloys, polysulfone (PSU), polyphenylsulfone (PPSU), polyetherimide (PEI), and styrene ethylene butylene styrene (SEBS). In some examples, highly semi-crystalline thermoplastic materials (e.g. PVDF) can be drawn into fibres by sandwiching and thermally consolidating them between drawable amorphous thermoplastics. In this way, shape memory polymers which might otherwise be unsuitable for drawing may still be drawn into a fibre.

Preforms may be fabricated by one or a combination of a number of techniques including: hot press, cast-moulding or injection moulding of thermoplastic pellets in vacuum; additive manufacturing techniques; direct machining of commercially acquired rods or bars; and rolling of thermoplastic sheets/films and consolidating into preforms.

The process of drawing a fibre comprises heating a portion of the preform to a temperature over its glass transition temperature which in turn allows the neck-down drawing of the preform to take place. During this process, the viscosity of the preform may decrease several orders of magnitude and the preform may be drawn down under its own weight. The drawing temperature should be primarily selected based on the preform material to be used. The higher the glass transition temperature of the preform material to be used, the higher the required draw temperature. It will be appreciated that heating of the preform may be provided by the draw apparatus such as by a resistive heater comprising part of the draw apparatus. Alternatively, heating of the preform may be provided by an external heating apparatus such as a resistive heater, a furnace configured to surround the portion of the preform to be drawn, or any other suitable apparatus. After the drawing of a portion of the preform into a fibre, the resultant fibre may cool (may be quenched) in order to set the shape of the fibre. Cooling of the fibre may occur in ambient conditions as a result of removing the fibre from the influence of the heating apparatus without further need for cooling. Alternatively, the fibre may pass through a region cooled by a cooling apparatus either comprising a part of the draw apparatus or independently provided. The cooling apparatus may comprise a cooled enclosure through which the drawn fibre passes or may comprise an apparatus for providing cooled air over the fibre. Any suitable method for providing for cooling of the fibre may be used. In addition, prior to heating the preform for drawing the fibre therefrom, a pre-heating stage may be provided. Preheating may be performed by any suitable heating apparatus and may be performed in order to avoid thermal shock and to help achieve a better temperature uniformity. It will be appreciated that in some examples, preheating may be unnecessary or may comprise part of the heating step.

The drawing of the fibre may be monitored by a monitoring apparatus. The monitoring apparatus may comprise one or more of a laser micrometre for measuring the diameter of the fibre or a three-wheel tension sensor for measuring the pulling tension of the fibre by measuring the effective internal stress inside the fibre.

During the drawing of the preform into a fibre, the temperature profile, the downfeed speed and the draw speed may be adjusted. The temperature profile describes the temperature regions through which the preform and resultant fibre pass. The downfeed speed is the rate at which the preform is moved into the heated region. The draw speed is the rate at which the fibre is pulled through the draw apparatus. By varying the temperature profile, the downfeed speed and the draw speed, the thickness of the resultant fibre may be adjusted.

Shape memory polymers have a shape recovery ability which makes them particularly useful in a range of applications. Shape memory polymers can also be light, easy to manipulate and economical compared to other materials with shape recovery abilities, such as shape memory alloys (SMAs). Shape memory polymers are able to memorise a permanent shape and, after deformation away from that permanent shape and setting into a temporary shape, the permanent shape can be recovered by the application of an appropriate stimulus.

The shape memory polymer achieves the shape memory effect by having a hard segment and a soft segment. The hard and soft segments are different phases of the shape memory polymer. The hard segment may be either crystalline, with a defined melting point, or amorphous having a defined glass transition temperature. In the case where the hard segment is crystalline, the soft segment is typically amorphous and has a defined glass transition temperature. In some examples, the soft segment is crystalline and has a melting point instead of a glass transition temperature. The melting point or glass transition point of the hard segment is substantially greater than the melting point or glass transition point of the soft segment.

The permanent shape may be set by heating the shape memory polymer above the melting point or glass transition temperature of the hard segment, deforming the shape memory polymer into the desired shape and then cooling the shape memory polymer below the melting point or glass transition point of the hard segment. A temporary shape can be set by heating the shape memory polymer above the melting point or glass transition temperature of the soft segment but less than the melting point or glass transition temperature of the hard segment, deforming the shape memory polymer into the desired temporary shape and then cooling the shape memory polymer to below the melting point or glass transition temperature of the soft segment. If the shape memory polymer is subsequently reheated above the melting point or the glass transition temperature of the soft segment but below the melting point or glass transition temperature of the hard segment, without any external forces seeking to deform the shape memory polymer into a new temporary shape, the shape memory polymer will recover to the permanent shape. While the examples above discuss the use of temperature to enter the soft or hard segments, in other embodiments, the shape memory polymer may alter its shape based on illumination with a particular wavelength of electromagnetic radiation, changes in surrounding ionic concentrations or pH, electric fields, magnetic fields or the application of ultrasound to the shape memory polymer.

According to a first aspect of the present invention, there is provided a method of manufacturing a device comprising at least a first fibre using a draw apparatus, the method comprising: providing a first preform comprising a shape memory polymer to the draw apparatus; heating a first portion of the first preform; and drawing, using the draw apparatus, the heated first portion in order to form the first fibre.

In order to manufacture a device from the first fibre, the method may comprise the further step of post-processing the first fibre to form the device. By post-processing we mean one or more steps following the steps of the first aspect of the invention that are carried out in order to manufacture a device from the first fibre. In embodiments of the invention where the device is a cochlear implant device, post-processing may involve steps such as moulding the first fibre into a patient-specific cochlear shape and/or connecting a wire extending through the first fibre to the relevant electronics. In other embodiments of the invention where the device is a catheter device, post-processing may involve steps such as passing a tendon through one or more lumens extending through the first fibre or attaching a connector to an end of a microfluidic channel provided in the first fibre for the input or output of fluid.

Manufacturing a device comprising at least a first fibre comprising a shape memory polymer may be particular advantageous for a wide range of applications. By forming the first fibre by way of drawing a preform comprising a shape memory polymer, particular cost savings may be made compared to prior art methods. Thus, a device comprising a fibre comprising a shape memory polymer may be formed more efficiently using a draw method than by other techniques. Prior art methods may require the expensive manufacture of moulds and the application of time-consuming post-processing techniques compared to manufacturing a device comprising a fibre comprising a shape memory polymer by way of a draw technique. In addition, fibres having smaller features or more intricate geometries may be achieved. Some features may be easier to form on a larger scale in the preform from which the fibre is drawn. Because the drawn fibre maintains the structural features of the original preform, improved resolution for features may be achieved compared to techniques which make devices in other ways. In some examples, this may be particularly advantageous where optical or electrical contacts need to be formed within a fibre device. By drawing a fibre from a preform and co-drawing one or more filaments, such as electrodes or optical fibres, through the hollow channels during draw, devices may be formed which are otherwise impractical or highly complex to achieve. In addition, drawing fibres comprising shape memory polymers according to the first aspect may provide for a scalable approach for forming devices which may not be achievable by additive manufacturing. By way of example only, 100 metres of fibre or more may be drawn using the present technique in short period, whereas 10 cm of a fibre may be printed by additive manufacturing in a similar time-frame. When compared to extrusion techniques, features such as helically arranged hollow channels or other features may not be achievable by those techniques. Thus, the method according to the first aspect may be particularly advantageous and provide for benefits which may not otherwise all be achievable by any other single technique.

A cochlear implant device, which may benefit from comprising a fibre comprising a shape memory polymer, may require helically arranged channels or other features. The shape memory polymer may be particularly well suited to such an application, as it may be able to be manipulated into the shape of the cochlear and subsequently cooled to set the shape. Using other techniques to form a device for such an application may be complex and time consuming, however, forming such a device according to the first aspect may reduce the complexity, time and associated costs with forming such a device. In another example, a catheter device for treating intercranial aneurysms formed by the method of the first aspect may allow for the incorporation of microfluidic channels for cooling the device which may allow for larger degrees of control in deploying the device. In yet another example, a fibre comprising a shape memory polymer formed by the method of the first aspect may allow for the accurate steering needed to access hard-to-reach targets for probe-based scanning in distal airways. The flexible scanning allowed by such a device may be implemented to smoothly collect images of cellular-scale details. This may allow for the subsequent stitching together by mosaicking algorithms to analyse large areas of tissue. By using a shape memory polymer fibre as part of the device, traditional cable-driven continuum robots may not be necessary, and instead, the shape memory properties of the device may be utilised to provide for smooth and controlled deflection of a portion of the device.

In addition, the shape recovery of a shape memory polymer may occur over the timescale of a one, ten, or tens of seconds. This may be particularly advantageous when a device comprising a fibre comprising the shape memory polymer is used in an environment where quick movements may cause damage to the surrounding environment, such as in the human body. This rate of shape recovery may particularly be advantageous for probes, where the slow shape recovery allows for desirable scanning of the probe over an area. This may allow for the safe, steady and continuous manoeuvring of a probe around blood vessels in the human body.

A device manufactured according to the first aspect may also be particularly useful in magnetic resonance (MR) applications, such as magnetic resonance imaging (MRI). Due to the large magnetic fields involved in magnetic resonance techniques, it is important to develop devices which use no or very little magnetic material. A device manufactured by this process may be free of magnetic materials. This may provide a device which can be safely used in an environment with a magnetic field. Providing for steerable and stiffness tunable devices which can be produced cost and time efficiently may be particularly advantageous. In one or more embodiments, the device may be for use in a magnetic resonance system and the device may consist of non-magnetic materials. In one or more embodiments, the device may be for use in an MRI system wherein the device comprises one or more hollow channels for flowing fluid therethrough. Where a fluid is passed through channels in the device, the fluid may be useful for visualising the device using MRI where polymers would not be detectable. For example, water may be detectable in an MRI system and visualisation of the device may allow for improved control and steering.

It will be appreciated that, during the drawing of the first preform into the first fibre, the portion of the preform which is being heated (referred to as the first portion) will change as the preform is lowered into a heating region and the first fibre is drawn from the first preform. As the first portion of the first preform is drawn to form the first fibre, another portion of the first preform is heated to allow for the continued drawing of a fibre. In order for the fibre to have a stable shape, it will be appreciated that the preform may be heated to a temperature at least above the melting point or glass transition temperature of the hard segment of the shape memory polymer.

As discussed above, the first fibre drawn from the first preform may be quenched to a temperature below the melting point or glass transition temperature of the shape memory polymer after being drawn in order to set the shape of the first fibre. Quenching the first fibre may be provided by removing the first fibre from the source of heat used to allow for the drawing of the fibre. In such an example, the cooling may be provided by the ambient conditions around the fibre. Alternatively, a quenching apparatus may be provided which provides for the lowering of the temperature of the drawn first fibre from the draw temperature. The quenching apparatus may comprise a part of the draw apparatus or may be a separate quenching apparatus. It will be appreciated that, while quenching involves reducing the temperature to one below the draw temperature, the quenching apparatus may still comprise a heater. For example, if drawing of the preform occurs at 200 degrees Celsius, the quenching apparatus may provide a heating apparatus for maintaining the fibre at a temperature of 80 degrees Celsius, which would be below the melting temperature of the fibre but may avoid thermal shock or allow for maintenance of a desirable temperature profile across the preform and fibre. In other examples, the permanent shape of the fibre may be set by exposing the fibre to UV radiation, changing the pH of its environment or in any other suitable way for setting the permanent shape of the shape memory polymer being used.

In one or more embodiments, the first preform may have a first hollow channel extending from a first end of the first preform in a draw direction at least partially through the first preform towards a second, opposing, end of the first preform, the draw direction comprising the direction in which the heated first portion is drawn using the draw apparatus. In one or more embodiments, the first preform may have at least a second hollow channel extending from the first end of the first preform in the draw direction at least partially through the first preform towards the second, opposing, end of the first preform. In one or more embodiments, the first hollow channel or the at least second hollow channel may extend from the first end of the first preform in the draw direction through the first preform to the second, opposing, end of the first preform. In one or more embodiments, the hollow channel may comprise a closed hollow channel, wherein a closed hollow channel is one which is radially enclosed by the material of the preform. In one or more embodiments, the hollow channel may comprise an open hollow channel wherein at least one portion of the hollow channel is not enclosed by the material of the preform. For example, an open hollow channel may comprise a groove on the side of the preform. While hollow channels of the description are generally described and depicted as having a circular cross section, it will be appreciated that the hollow channels may comprise any cross-sectional shape.

Hollow channels in fibres resultant from a method of the first aspect may be particularly useful for passing fluids, such as water, therethrough for providing for cooling, and therefore stiffening, of the shape memory polymer. In other examples, fluids may be passed through the hollow channels to provide for heating of the fibres. In either way, control of the flexibility of the device may be provided by the provision of fluid through one or more hollow channels. In some examples, the first hollow channel may allow for the provision of medicaments therethrough such that the device can be used for drug or anaesthetic delivery.

In one or more embodiments, the step of drawing the heated first portion in order to form the first fibre may further comprise rotating the first portion of the first preform around the draw axis with a first radial velocity such that a resultant first fibre comprises at least a first helical hollow channel, the draw tower comprising a first preform holder configured to hold and provide for said rotation of the first preform.

Where one or more hollow helical channels of a resultant fibre are used for flowing fluid therethrough for the purposes of cooling the shape memory polymer, the helical channel may provide for more efficient cooling by way of being more evenly distributed through the volume of the first fibre. The formation of helical channels may be particularly easy and cheap to achieve using a method involving the drawing of the preform as compared to prior art methods, resulting in reduced costs and improved device structure.

It will be appreciated that the magnitude of the rotational velocity of the first portion of the first preform will determine the pitch, i.e., the inter-channel spacing, of the coils of a helical hollow channel in the resultant first fibre. Where cooling is provided by the circulation of fluid through the helical hollow channels, more thorough cooling will be provided in a fibre with a smaller pitch and correspondingly a longer channel path length than for a fibre having a hollow channel with a larger pitch. It will be appreciated that the first radial velocity may be altered during the drawing process so as to provide different pitches along the length of the resultant fibre. It will be appreciated that a fibre having different pitches of a helical hollow channel therethrough may allow for particularly efficient cooling of areas of the resultant fibre with a small pitch while the remainder of the fibre may not receive much cooling. This may allow for targeted stiffening of segments of the preform. In one or more examples, the method may include changing one or both of the magnitude and rotational direction of the first radial velocity during the drawing of the first fibre.

It will be appreciated that rotation of the preform by 360 degrees may provide for the single loop of a helix to be formed in the resultant fibre. In other embodiments, the direction of rotation of the preform may be varied during drawing of the preform into a fibre such that full helixes are not formed, but only partially helical channels are formed. While full helixes may not be formed in the channels of some embodiments, it will still be appreciated that the varying nature along the length of the resultant fibres still provide a partially helical structure and that descriptions of helical hollow channels will encompass such channel shapes.

In one or more embodiments, the method may further comprise the steps of:

providing a second preform comprising a shape memory polymer, the second preform having a receiving channel extending from the cross-sectional centre of a first end of the second preform in the draw direction at least partially through the second preform towards the cross-sectional centre of a second, opposing, end of the second preform, the receiving channel having a cross-sectional area at least equal to the cross-sectional area of the first preform such that the receiving channel is suitable for receiving the first preform within the receiving channel, the second preform further having at least a first hollow channel, different from the receiving channel, extending from one of the first surface and the second surface in a draw direction at least partially through the second preform towards the opposing end of the second preform;

heating a first portion of the second preform; and drawing, using the draw apparatus, the heated first portion of the second preform in order to form a second fibre.

In one or more embodiments, the method may further comprise the step of:

inserting the first preform into the receiving channel of the second preform prior to heating the first portion of the first preform and heating the first portion of the second preform;

wherein the steps of heating the first portion of the first preform and heating the first portion of the second preform are co-performed; and wherein the steps of drawing, using the draw apparatus, the heated first portion of the first preform and drawing, using the draw apparatus, the heated first portion of the second preform are co-performed such that, during the step of drawing, the first and second fibres form together to provide the device, the draw tower comprising a second preform holder configured to hold the second preform and arranged to, in use, extend at least partially around one or both of the first preform holder and the first preform. Providing for a device formed of a first preform and a second preform and providing for separate preform holders for each of the preforms may allow, for example, a device to be formed from the first and second fibres wherein a portion of the device comprises helical channels and a portion of the device comprises straight channels. Arrangements like this may be particularly advantageous in a number of applications, such as for medical catheters.

In one or more embodiments, the first preform and the second preform may be drawn separately to form separate first and second fibres, the method may further comprise the step of, after drawing the first and second fibres:

inserting the first fibre into the receiving channel of the second fibre; and securing the first fibre inside the receiving channel of the second fibre. Providing a device by this method may provide an alternative way to manufacture a device having different characteristics in an inner and an outer portion of the device.

It will be appreciated that securing the first fibre inside the receiving channel of the second fibre may be performed by any suitable method, such as by frictional fit, the use of adhesive between a least part of the interface between the first fibre and the second fibre, the use of a crimping technique, or any other suitable method.

In one or more embodiments, the step of drawing the heated second portion in order to form the second fibre may further comprise rotating the first portion of the second preform around the draw axis with a second radial velocity, different to the first radial velocity, such that a resultant second fibre comprises a helical hollow channel and wherein the second preform holder is configured to provide for rotation of the second preform. In one or more embodiments, the first and second radial velocities may be the same.

It will be understood that the centrally arranged receiving channel, upon rotation of the second preform, is unlikely to provide for a helical channel if it has a circular cross-section because the central arrangement of this channel is rotationally symmetric around the axis of rotation. However, it will further be appreciated that, in reality, some amount of helical character may be imparted upon the receiving channel if the receiving channel is not rotationally symmetric, e.g. it has a non-circular cross section, or if it is not perfectly centrally arranged in the cross-section of the first end of the second preform. It will be appreciated that, if the receiving channel does not comprise a circular cross section, then the corresponding central hollow channel in the resultant fibre will comprise a cross sectional shape which spirals along the length of the fibre. The first hollow channel of the second preform, which cannot be centrally arranged in the cross-section of the second preform, because that is where the receiving channel is located, will provide for the helical hollow channel in the resultant second fibre if the second preform is rotated during draw.

In one or more embodiments, the first radial velocity may have an opposite rotational direction to the second radial velocity. It will be appreciated that having a different rotational direction of the radial velocity will result in the helical channels of the first fibre and the second fibre having different chiralities. That is to say that, where the first and second preform are rotated in opposing rotational directions, the resultant hollow channels in the first and second fibres will rotate in different directions around the device.

In one or more embodiments, the first radial velocity may have a different magnitude to the second radial velocity. It will be appreciated that having a different magnitude of the radial velocity will result in a different inter-channel pitch between helical channels formed in the first fibre and second fibre. This may advantageously provide for the tuning of the pitch of the first and second helical channels which may be useful where the helical channels of the first fibre and the second fibre have different intended uses in the device.

Alternatively, a selectable degree of cooling may be provided for by selecting a helical channel to provide a cooling fluid therethrough with a helical channel having a smaller pitch providing for greater cooling than a helical channel having a larger pitch.

In one or more embodiments, the method may comprise the step of: co-feeding one or more of: a steering tendon; an electrode; and an optical fibre through the first or at least second hollow channel of the first preform. In one or more embodiments, such elements may be drawn through the at least first hollow channel of the second preform during drawing. The ability to co-feed additional elements into the preform in order to provide for fibres having said elements formed therein provides for a reduction or elimination of post-processing steps to form the device and may also allow for the formation of smaller devices than was previously possible.

Providing steering tendons through one or more hollow channels in the first or second fibres allows for the steering of the device. This may be particularly useful where the device comprises a medical device such as a catheter for medical applications. In some examples, providing for one or more electrodes through one or more hollow channels may allow for electrochemical sensing to be performed, which may provide helpful functionality, for example, to a medical probe device. In other examples, electrodes may be provided through the fibres in order to provide for direct heating of the fibres in order to provide for control of the flexibility of the shape memory polymer by way of resistive heating. In the example of one or more optical fibres being co-fed through one or more hollow channels, this may provide for either an illumination functionality or a visual probe. In other examples, the passing of light through the optical fibres may also provide for flexibility tuning of the shape memory polymer by photothermal heating. Photothermal heating, otherwise known as optical heating, may provide for a particularly advantageous way to activate a transition in a shape memory polymer. It will be appreciated that, where a plurality of hollow channels are provided in a first or second preform, any single preform may have any combination of steering tendons, electrodes and optical fibres co-fed into a fibre during draw. Steering tendons, electrodes and optical fibres may be referred to generally as filaments. For example, where the melting temperature of a filament is higher than the temperature used to draw the preform into a fibre, the feeding of the filament into the hollow channel of the preform during draw may allow a for a particularly easy way of positioning these filaments within the fibres. It will be appreciated that this process may be significantly more difficult in post processing steps where a small filament needs to be fed into a very small channel in a final fibre and that, further the fixing of the filament within the aperture may also be particularly difficult in post processing. In one or more embodiments, the preform may be configured to be drawn around a filament co-fed therethrough such that the filament is fixedly arranged within hollow channel of the resultant fibre. This may be particularly advantageous for arranging electrodes or optical fibres within the hollow channels. In one or more embodiments, a hollow channel in the preform may be configured to be drawn around a filament co-fed therethrough such that the filament is moveably arranged within the hollow channel of the resultant filament. This may be particularly advantageous for arranging steering tendons within the hollow channels, as these need to be able to slidably move to provide for manipulation of the fibre.

In some examples, if a steering tendon, an electrode or an optical fibre is co-fed into a hollow channel which is formed into a helical hollow channel during drawing of the fibre, an advantageous structure may be provided. In one example, a fibre may be formed which comprises a first straight hollow channel extending in the draw direction through the fibre from a first end to a second, opposing, end of the fibre. The fibre may further comprise a second hollow channel also extending in the draw direction straight through the fibre from the first end to the second, opposing, end of the fibre. In this arrangement, if the fibre is bent, one hollow channel may become extended in length while the second hollow channel becomes contracted due to the bend. Such an extension and contraction would also impact any filaments or other features which may run through the hollow channels, which may cause increased tension on one filament resulting in unintended bending at the tip to compensate for the length change or even damage to the filaments. In contrast, where the hollow channels are helically arranged within the fibre, bending of the fibre may not result in such large undesirable path length changes. By providing for a way to avoid these path length changes, damage to the filaments provided therein may be avoided or mitigated in order to thereby provide for a more reliable device.

In one or more embodiments, the method may further comprise, after forming the first fibre, the steps of:
    forming a first hollow bridging channel in the first fibre between the first and second hollow channels at a first distance along the first fibre; and
    sealing the first and second hollow channels of the first fibre beyond the first hollow bridging channel such that the first hollow channel, the second hollow channel and the first hollow bridging channel of the first fibre provide an interconnected flow channel for the flowing of water from the first hollow channel to the second hollow channel via the first hollow bridging channel of the second fibre.

In one or more embodiments, the second preform may have at least a second hollow channel extending from the same end of the second preform as the first hollow channel of the second preform extends from in the draw direction at least partially through the second preform towards the opposing end of the second preform, and wherein the method may further comprise, after forming the second fibre, the steps of:
    forming a first hollow bridging channel in the second fibre between the first and second hollow channels at a second distance along the second fibre; and
    sealing the first and second hollow channels of the second fibre beyond the first hollow bridging channel such that the first hollow channel, the second hollow channel and the first hollow bridging channel of the second fibre provide an interconnected flow channel for the flowing of fluid from the first hollow channel to the second hollow channel via the first hollow bridging channel of the second fibre.

Providing for an interconnected flow channel in the first or second fibres may be particularly advantageous for providing a cooling arrangement which allows for the flow of a coolant fluid from a first end of the resultant fibre, through the fibre and back out of the same end of the fibre. This may be particularly advantageous for medical devices for which the egress of fluid at any point other than an end of the device, such as a point of the device not inserted in a patient, could be dangerous. It will be appreciated that, where the first and second hollow channels do not extend all the way through the first or second preforms, the step of sealing the hollow channels may not be necessary. For example, in some embodiments, the interconnected flow channel may be formed in the preform prior to drawing the preform into a fibre. In some embodiments, a single fibre may comprise a plurality of interconnected flow channels.

In one or more embodiments, the method may further comprise the steps of:
- forming an inter-fibre hollow bridging channel between a hollow channel of the first fibre and a hollow channel of the second fibre at a distance along the first and second fibres; and
- sealing the corresponding hollow channels of the first and second fibres beyond the inter-fibre hollow bridging channel such that an inter-fibre interconnected flow channel is formed for the flowing of fluid therethrough.

Providing for an inter-fibre interconnected flow channel may be particularly advantageous where it is desirable to have the fluid flow through two helical channels of different chiralities or pitches. Alternatively, an inter-fibre interconnected flow channel may be advantageous where it is desirable to allow the flow of the fluid partly through a helical channel in one direction and then out of the device through a straight channel.

In one or more embodiments, the first or the second preform may be formed to have a first hollow channel and a second hollow channel connected by a bridging channel such that post-processing of the fibre is not necessary to provide the interconnected flow channel. Formation of a preform using this structure may be performed by 3D printing. This may be particularly advantageous for removing the requirement of the post-processing of forming the hollow bridging channel and sealing the hollow channels.

In one or more embodiments, the first and the second fibre may further comprise at least a third hollow channel and a forth hollow channel resulting from third and fourth hollow channels in the corresponding first or second preform, wherein the method further comprises the steps of:
- forming a second hollow bridging channel between the third and fourth hollow channels at a third distance along one of the first and second fibres, the third distance different to at least one of the first distance and the second distance; and
- sealing the third and fourth hollow channels beyond the second hollow bridging channel such that the third hollow channel, the fourth hollow channel and the second hollow bridging channel provide a second interconnected flow channel having a different length to the first interconnected flow channel for the flowing of water from the third hollow channel to the fourth hollow channel via the second hollow bridging channel.

It will be appreciated that any number of interconnected flow channels may be provided within the device. Providing for a plurality of interconnected flow channels which extend different distances through the fibres may be particularly advantageous for controlling the radius of curvature of the device. For example, where the device is generally warm enough for the shape memory polymer to be in the soft segment and thereby flexible, coolant fluid may be circulated through a selected interconnected flow channel in order to reduce the temperature of a portion of the device to below the soft segment melting point or glass transition temperature such that a portion of the device stiffens and a remaining portion of the device is flexible. This may be particularly advantageous for medical devices which are inserted into the human body.

In one or more embodiments, the method may comprise a method for manufacturing a medical device, such as a catheter, a guidewire, a microguidewire or a microcatheter, wherein the medical device comprises the first fibre. In one or more embodiments, the method may comprise a method for manufacturing one of: a cochlear implant; a catheter for embolic aneurysm treatment; and a probe, such as a probe for probe-based endomicroscopy.

In one or more embodiments, the shape memory polymer comprises a two-way shape memory polymer. This may be particularly advantageous for providing soft actuation for use in soft robotics applications.

In one or more embodiments, the first preform may comprise a tip portion and a body portion, wherein one of the tip portion and the body portion comprise the shape memory polymer and the other of the tip portion and the body portion comprise a material suitable for drawing into a fibre other than a shape memory polymer. In an alternative embodiment, the tip portion and the body portion may both be formed of different shape memory polymers having different hard segment melting point or glass transition temperatures and different soft segment melting points or glass transition temperatures. In particular, the tip portion may comprise a shape memory polymer. This may provide for a device wherein the tip portion of the device is flexible when inserted into the human body. In some examples, this may provide for a device which has a stiffness tunable tip.

According to a second aspect of the present invention, there is provided a preform comprising a shape memory polymer for drawing using the method of the first aspect.

It will be appreciated that, while some of the example embodiments described above are described in isolation from each other, the various embodiments may be particularly advantageously combined in order to provide for devices having desirable combinations of properties.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

One or more embodiments will now be described by way of example only with reference to the accompanying drawings in which.

Figure 1:
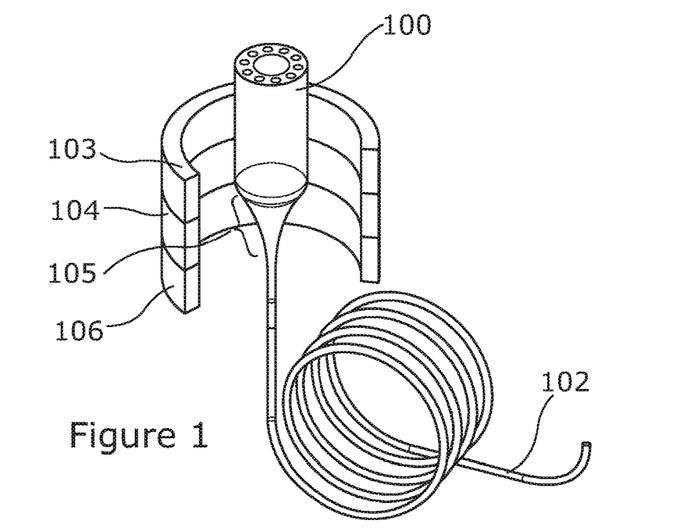
FIG. 1 is a schematic representation of a preform being drawn into a fibre.

As shown in FIG. 1, a preform 100 comprising a shape memory polymer can be drawn into a fibre 102. The drawing of a preform 100 into a fibre 102 results in the significant elongation of the material and a reduction in the material's cross-sectional extent. This method of forming fibres 102 may be particularly advantageous, as any features in the original preform 100, such as hollow channels or arrangements of materials, are maintained in the resultant fibre 102 at a reduced scale. This allows for the manufacturing of a preform 100 having desirable features on a large scale so that a fibre 102 having those desirable characteristics but a significantly smaller cross section, can be produced.

The manufacturing process to form a fibre 102 from a preform 100 comprises a number of stages. The preform 100 to be drawn into a fibre is provided to the draw apparatus (not shown). In some examples, the preform 100 may be held by a preform holder (not shown) which maintains the position of the preform 100. In a first stage, a portion of the preform 100 may be pre-heated by a pre-heating apparatus 103. Subsequently, a first portion 104 of the preform 100 may be heated by a heating apparatus 105 to a temperature suitable for drawing a fibre 102 therefrom. The speed of drawing of the fibre 102 may be controlled primarily by gravity or the control of the draw rate may be controlled by the draw apparatus. In some examples, the preform is initially allowed to neck-down under gravity, after which the tip of the necked-down portion is cut off. Once the necked-down portion has been removed, the remaining drawn fibre may be connected to a capstan which may be used to draw the fibre. Control of the draw speed may be provided by the capstan or may be controlled by any other suitable apparatus. The portion of the preform 100 which has been drawn into a fibre 102 is quenched in order to set the fibre shape. Quenching the fibre 102 may be achieved by removing the fibre 102 from the influence of the heating apparatus or, as shown in the example of FIG. 1, the fibre 102 may be cooled to a temperature below the draw temperature by a quenching apparatus 106 in order to provide for cooling of the fibre 102.

Figure 2:
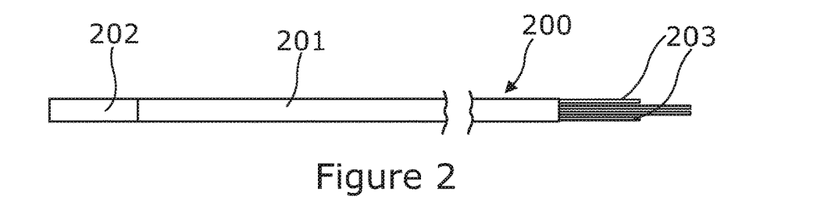
FIG. 2 is a schematic representation of a device comprising a fibre a body portion and a tip portion.
Figure 3:
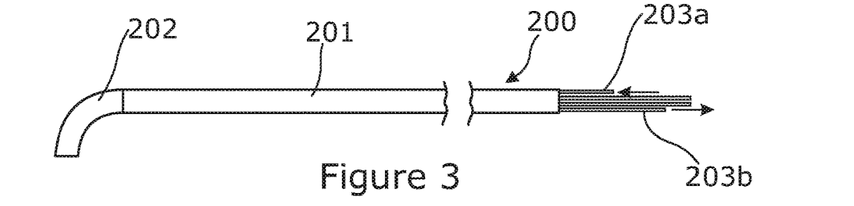
FIG. 3 is a schematic representation of the device of FIG. 2 wherein the flexible tip portion has been manipulated by tendons

Moving now to FIGS. 2 and 3, there is provided a fibre 200 resulting from the method of the present invention having a body portion 201 and a tip portion 202. In this example, the body portion 201 comprises a material that is suitable for drawing into a fibre other than a shape memory polymer material. The tip portion 202 comprises a shape memory polymer. Steering tendons 203 extend through hollow channels in the fibre towards the tip portion 202 of the fibre 200, the manipulation of which may provide for control of the direction of the tip portion 202 of the fibre 200 when the shape memory polymer is at a temperature above the glass transition temperature or melting point of the soft segment of the shape memory polymer. On cooling of the fibre below the glass transition temperature or melting point of the soft segment, the shape of the shape memory polymer tip will be locked, i.e., the shape will be memorised. This may be particularly useful for distal catheterisation or steering through tortuous blood vessels. Subsequently, where necessary, the tip may be allowed to be heated and then re-cooled.

In the example of FIG. 2, the tendons 203 have not been biased in order to manipulate the tip portion 202 of the fibre 200 and instead are at a rest position, as such, the tip portion 202 remains straight. In the example of FIG. 3, steering tendon 203*b* has been pulled out of the fibre 200 and steering tendon 203*a* has been pushed into the fibre 200 relative to the rest position of FIG. 2. This results in a force applied to the tip portion 202 of the fibre 200 and thereby a steering of the tip portion 202. It will be appreciated that control of the direction and position of the tip portion 202 of a fibre 200 may be particularly advantageous in a plurality of applications for different types of probe devices or devices which need to penetrate into, and be steered within, a body.

Figure 4:
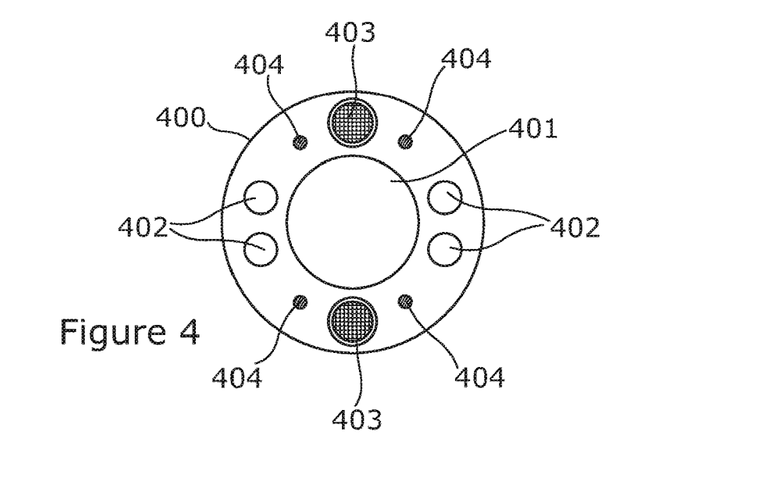
FIG. 4 is an end view of an example figure comprising a plurality of hollow channels, some of which comprise co-fed features.

FIG. 4 shows an end view of a fibre 400 which may be formed by the method of the present invention. In this example, a plurality of hollow channels 401, 402, 403, 404 may have been provided in the preform from which the fibre 400 was drawn or, alternatively, the hollow channels 401, 402, 403, 404 may have been formed after drawing the fibre 400. In this example, a central hollow channel 401 is arranged in the centre of the fibre 400 to provide a lumen in the fibre 400. This central hollow channel 401 may be particularly useful for providing for targeted drug delivery through the fibre 400 or for passing light therethrough. In other examples, the central hollow channel may provide for a fibre with biopsy forceps. In still other examples, an optical fibre may extend through the central hollow channel which may provide for therapeutic or diagnostic purposes. Further hollow channels 402 are provided which provide fluidic channels for the fibre 400. The fluidic channels 402 may be particularly useful for providing cooling or heating fluids therethrough in order to manipulate the flexibility of the shape memory polymer of the fibre 400. The fluidic channels may also be used for targeted drug delivery. Still other hollow channels 403 in the preform have steering tendons co-fed therethrough during the drawing process. As described above, steering tendons may be used to provide for manipulation of a flexible portion of the fibre 400, such as the at least part of the fibre 400 comprising the shape memory polymer. In yet another example, hollow channels 404 in the preform may have electrodes co-fed therethrough during the drawing process. Electrodes may be particularly useful for providing for heating of the fibre or for operating as sensors in, for example, electrochemical sensing. In some examples, liquid may be co-drawn through one or more hollow portions during drawing of the preform into a fibre.

Figure 5:
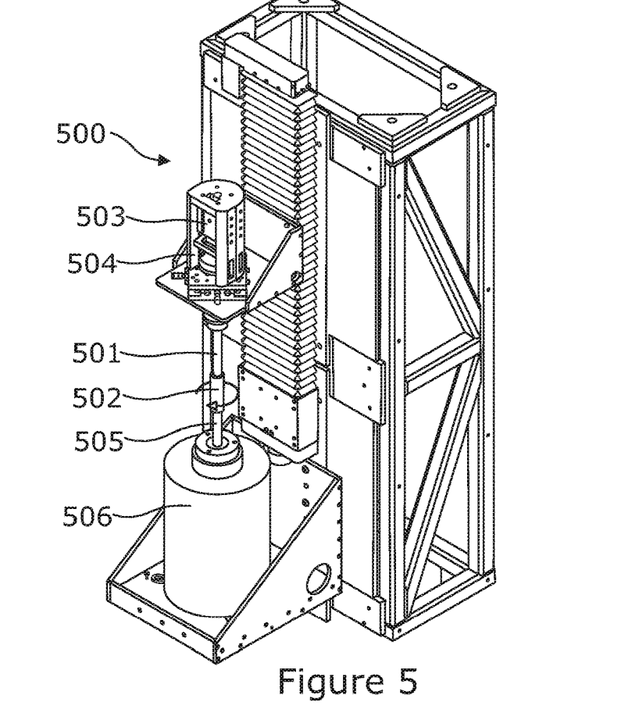
FIG. 5 is a schematic representation of a draw apparatus used to draw a preform comprising a shape memory polymer into a fibre.

Moving now to FIG. 5, there is provided a draw apparatus 500, wherein the draw apparatus 500 is a draw tower. The draw apparatus 500 comprises a preform holder 501, a preform coupler 502, a preform spinning motor 503, a preform spinning motor mount 504, the preform 505 and the temperature-controlled apparatus 506, the temperature-controlled apparatus 506 comprising at least a heating apparatus and a quenching apparatus. In this example, the preform 505 is mounted in the draw apparatus 500 by way of the preform coupler 502, which may be configured to receive preforms of differing sizes.

During drawing of the preform 505 into a fibre, the preform 505 is lowered by draw apparatus 500 into the temperature-controlled apparatus 506 in order to provide for heating and subsequent cooling of the preform 505 and resultant fibre. When desirable, the preform spinning motor 503 provides for rotation of the preform 505 via the preform holder 501 during draw. Providing for rotation of the preform 505 during draw may allow for the formation of fibres having helical features therein, such as a helical hollow channel. It will be appreciated that, during drawing of the preform 505 into a fibre, any features in the preform not centrally arranged and radially symmetric in the cross-section of the preform will take on a helical structure or spiraled arrangement in the resulting fibre.

Figure 6:
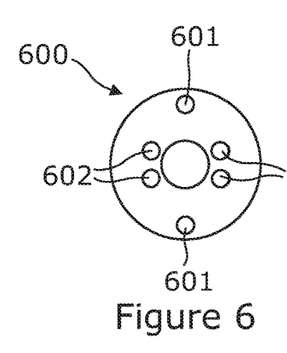
FIG. 6 is a schematic representation of an end view of a target device.

It may be desirable to form a device 600 having a fibre comprising one or more hollow channels 601, 602 which have one or both of different chiralities (rotate in opposite directions around the fibre) or different pitches (have different inter-channel spacings). As shown in FIG. 6, the desired device 600 may comprise first hollow channels 601 on the outer portion of the device 600 and second hollow channels 602 on the inner portion of the device 600. For example, the first hollow channels 601 in the final device 600 may have steering tendons co-fed therethrough and the second hollow channels 602 may be used as fluidic channels for providing cooling of the device 600.

Figure 7:
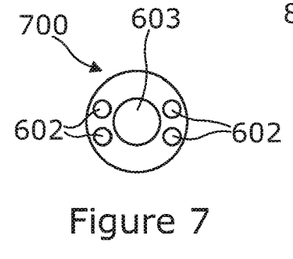
FIG. 7 is a schematic representation of an end view of a first fibre.
Figure 8:
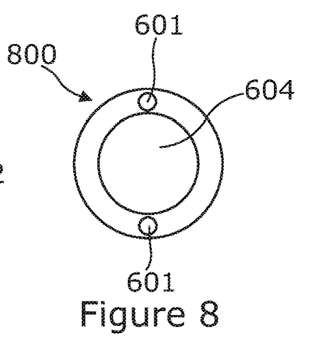
FIG. 8 is a schematic representation of an end view of a second fibre.

A device 600 having the structure described in relation to FIG. 6, may be formed by drawing first and second fibres from first and second preforms 700, 800 having cross sections as shown in FIGS. 7 and 8. The first preform 700, as shown in FIG. 7, may comprise an inner preform in this example having a central hollow channel 603 and a plurality of hollow channels 602 for providing fluidic channels in a resultant fibre. It will be appreciated that, for the purposes of demonstrating the present structure, the purpose of the hollow channels is irrelevant. The second preform 800, as shown in FIG. 8, may comprise an outer preform having a receiving channel 604 extending from the cross-sectional centre of a first end of the second preform 800 in the draw direction at least partially through the second preform towards the cross-sectional centre of a second, opposing, end of the second preform 800. In this example, the diameter of the receiving channel 604 is at least equal to the diameter of the first preform 700. By providing a suitably sized diameter for the receiving channel 604, the first preform 700 is able to be received within the receiving channel 604 of the second preform 800, in order to form the desired device 600. It will be appreciated that, while the cross-sections of the first preform 700 and the receiving channel 604 in this example are circular, any cross-sectional shape may be used so long as the cross section of the receiving channel 604 is suitably sized and shaped for receiving the first preform 700 therein.

It will further be appreciated that a third preform could be provided which comprises a receiving channel having a cross-section suitable for receiving the second preform 800 therein. In this way, a device may be formed having a plurality of different layers, each of which are drawn in a different manner in order to impart desirable properties on the resultant layers of fibre.

Figure 9:
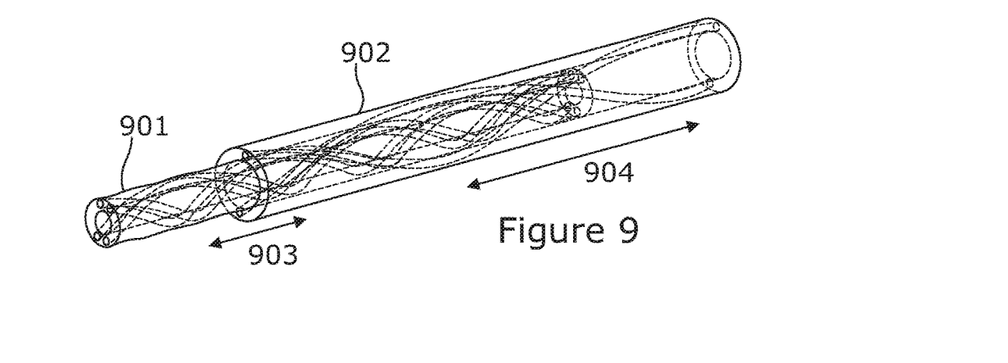
FIG. 9 is an isometric schematic representation of one method of forming a device of FIG. 6 using the fibres of FIGS. 7 and 8.

As shown in FIG. 9, by drawing of the first and second preforms 901, 902 at different speeds, the hollow channels of the resultant fibres may have different pitches 903, 904. In order to form the desired device 600, the first fibre 901 must be received within the receiving channel of the second fibre 902. In this example, the first fibre 901 is inserted into the receiving channel of the second fibre 902 after forming the fibres. The first fibre 901 is then secured within the receiving channel of the second fibre 902. Securing the first fibre 901 within the receiving channel may be performed in any suitable way, such as by a friction grip, adhesive, crimping, or by any other appropriate technique.

Figure 10:
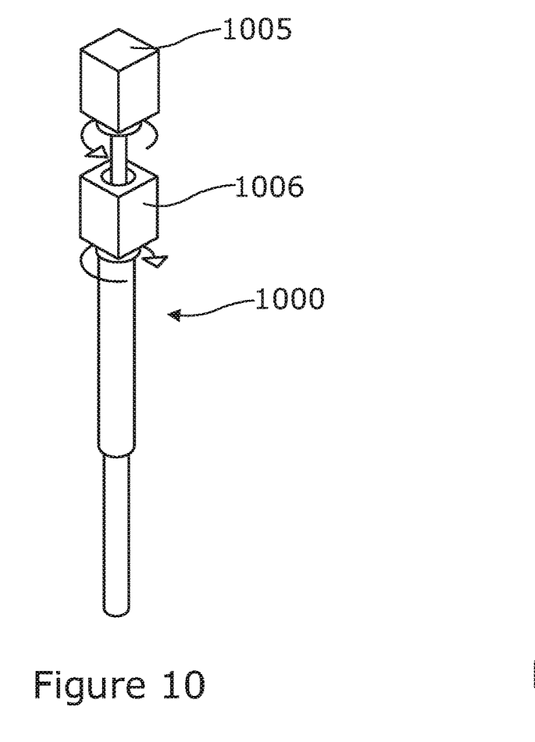
FIG. 10 is an isometric schematic representation of a first and second preform holder.
Figure 11:
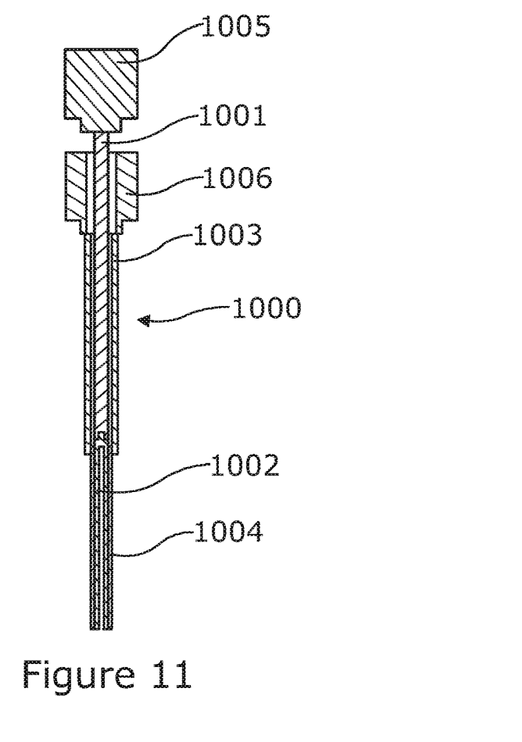
FIG. 11 is a cross-sectional schematic representation of the first and second preform holder of FIG. 10.
Figure 12:
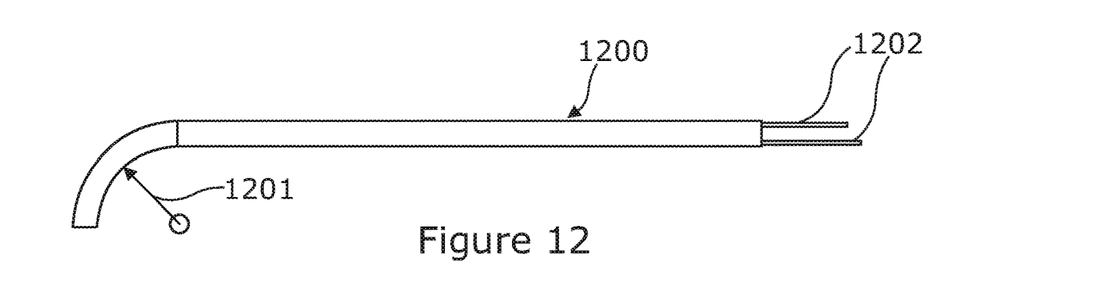
FIG. 12 is an isometric cross-sectioned schematic representation of a fibre having a first interconnected flow channel extending a first distance along the fibre.
Figure 13:
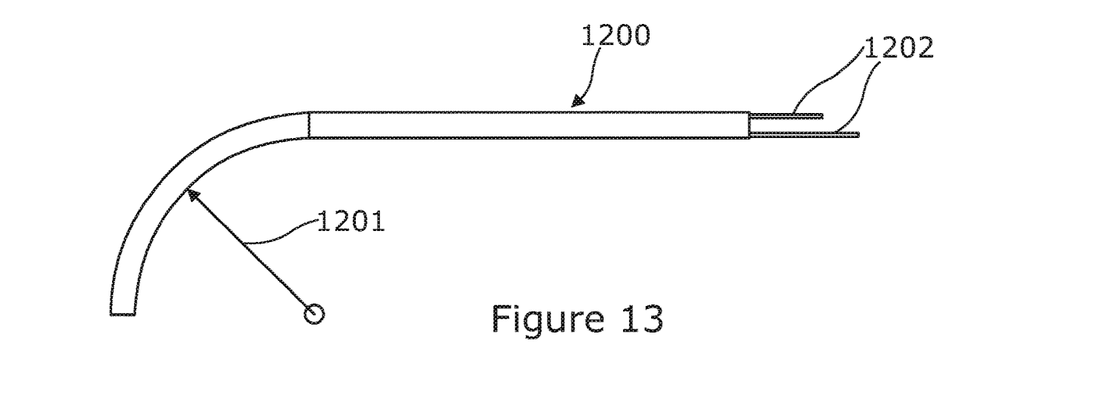
FIG. 13 is an isometric cross-sectioned schematic representation of a fibre having a second interconnected flow channel extending a second distance along the fibre.

As shown in FIGS. 10 and 11, in an alternative embodiment, a device 600 having helical hollow channels of different pitches or chiralities may be formed by a draw apparatus 1000 comprising a first preform holder 1001 configured to hold the first preform 1002 and a second preform holder 1003 configured to hold the second preform 1004 wherein the second preform holder 1003 is arranged to, in use, extend at least partially around one or both of the first preform holder 1001 and the first preform 1002. It will be appreciated that most of the features of the draw apparatus 500 shown in FIG. 5 have been excluded from FIGS. 10 and 11 for clarity. In this example, a first preform spinning motor 1005, such as a servo motor, is coupled to the first preform holder 1001 in order to provide for rotation of the first preform 1002 and a second preform spinning motor 1006, such as a hollow-bore servo motor, is coupled to the second preform holder 1003 for rotation of the second preform 1004.

In the embodiments depicted in FIGS. 10 and 11, the step of drawing the first preform 1002 and the second preform 1004 can be co-performed so that the resultant first and second fibres provide for the desired device. This may provide for a reduction in the post-processing steps required to obtain a desired device and, thereby, may provide for reduced cost and complexity. It will be appreciated that in some embodiments, instead of providing for rotation of both the first and second preforms 1002, 1004, only one of the first or second preforms 1002, 1004 may be rotated in order to provide a final device having some helically arranged channels and some straight channels.

As shown in FIGS. 12-15, some example devices 1200 formed by drawing a preform comprising a shape memory polymer into a fibre may allow for the tuning of the radius of curvature 1201 of the device 1200, 1400. Tuning of the radius of curvature 1201 may be provided by controlling length of the device 1200, 1400 which is flexible. It will be appreciated that, once a device 1200, 1400 achieves a desired curvature, which may be controlled by tendons 1202 extending through the device, the device may be cooled below the melting point or glass transition temperature of the soft segment of the shape memory polymer in order to set the temporary shape of the device 1200, 1400.

Figure 14:
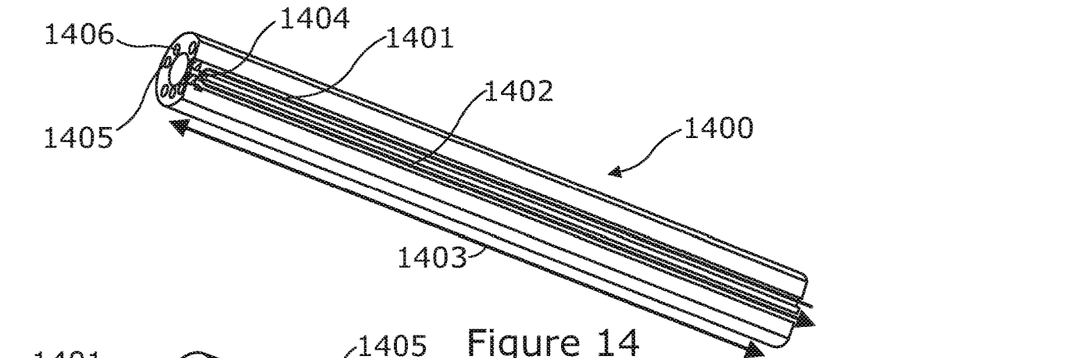
FIG. 14 is a schematic representation of a fibre having a first radius of curvature.
Figure 15:
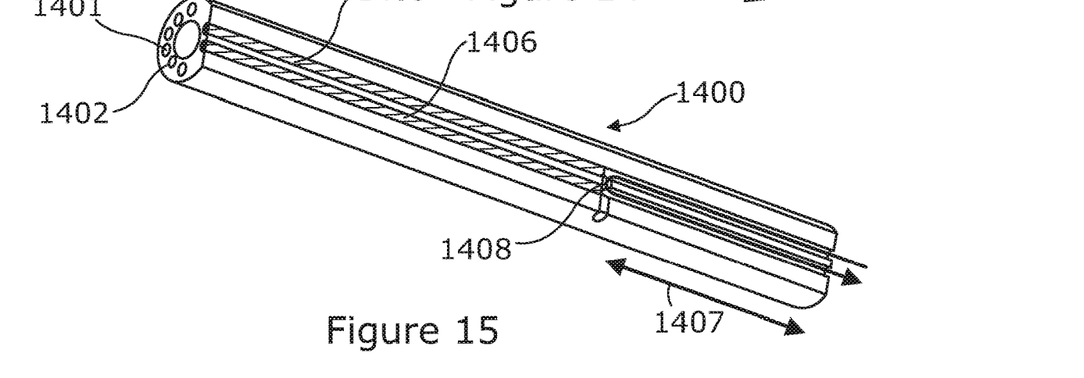
FIG. 15 is a schematic representation of a fibre having a second radius of curvature.

As shown in FIGS. 14 and 15, a fibre may comprise first and second hollow channels 1401, 1402 which extend a first distance 1403 along the device 1400. These first and second hollow channels 1401, 1402 are connected by a first bridging channel 1404 in order to provide for a first interconnected flow channel for flowing fluid from the first hollow channel 1401 to the second hollow channel 1402 via the first bridging channel 1404.

As highlighted by the cross-section of FIG. 14, where the first and second channels 1401, 1402 extend along substantially all of the length of the device 1400, the passing of a cooling fluid through the first interconnected flow channel may result in the stiffening of the shape memory polymer of the device 1400 in its present shape. Conversely, removing the cooling fluid when the device 1400 is in a warm environment, may allow for a large radius of curvature by making the whole fibre length flexible.

As highlighted by the cross-section of FIG. 15, the device 1400 may further comprise third and fourth hollow channels 1405, 1406 which extend a second distance 1407 along the device 1400. The third and fourth channels 1403, 1404 are connected by a second bridging channel 1408 in order to provide for a second interconnected flow channel for flowing fluid from the third hollow channel 1405 to the fourth hollow channel 1406 via the second bridging channel 1408. By providing for cooling through the second interconnected flow channel, only a portion of the length of the device 1400 is stiffened while the remainder of the device remains flexible.

By providing for the first and second interconnected flow channels in the same device 1400, the radius of curvature of the device 1400 may be controlled by selecting which of the interconnected flow channels to flow cooling or heating fluid through. In some examples this may allow for a microcatheter device to achieve tunable steering whilst manoeuvring through tortuous blood vessels.

In some examples, the preform from which the fibre of the devices of FIGS. 12-15 are drawn may comprise hollow channels extending from the first end surface to the second, opposing, end surface. After drawing the preform into the desired fibre, in order to form the interconnected flow channel, post processing steps may be taken of forming the one or more required bridging channels between the hollow channels and sealing the hollow channels between the hollow bridging channel and one end of the fibre. The step of connecting the channels may be achieved by any suitable technique, such as laser machining of drilling. In order to seal the hollow channels, and any aperture caused by connecting the channels, any appropriate material and technique may be used, such as using heat shrinking polymers or flexible UV curable resins.

In other examples, the preform may comprise the interconnected flow channel prior to drawing the preform into a fibre and the post-processing steps of forming the bridging channel and sealing the hollow channels may be unnecessary. A preform having such a structure may be formed, for example, by additive manufacturing techniques.

Figure 16:
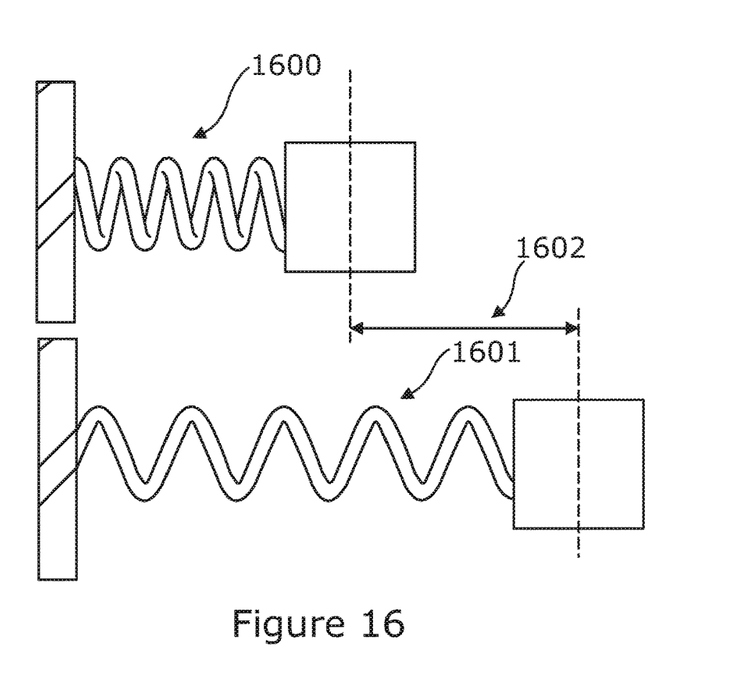
FIG. 16 shows a schematic representation of a coiled device in first and second arrangements.

Moving now to FIG. 16, in one or more embodiments, there is provided a device which is formed into a coiled spring structure. After drawing of the fibre from the preform, the resultant fibre may be set into a first spring configuration 1600 by heating it above the glass transition temperature or the melting point of the hard segment, wrapping the fibre around a mould and then cooling the fibre to below the glass transition temperature or the melting point of the hard segment. In some examples, the mould may comprise a Teflon™ (PTFE) mould. In some examples, Teflon™ mandrels may be passed through any hollow channels in the fibre to prevent the channels from collapsing during the step of programming the first spring configuration 1600. The Teflon™ mandrels may be removed after setting the first spring configuration 1600. At a temperature above the glass transition temperature or the melting point of the soft segment, the device may be deformed into a second spring configuration 1601 which will be retained on cooling the device below the glass transition temperature or the melting point of the soft segment. This first spring configuration 1600 and the second spring configuration 1601 may have a spring extension difference 1602. The spring device may then recover its first spring configuration 1600 on reheating the spring above the glass transition temperature or the melting point of the soft segment. However, return to the second spring configuration 1601 will not be possible without actively deforming the fibre using mechanical force while heated above the glass transition temperature or melting point of the soft segment.

In some examples, the shape memory polymer may comprise a two-way shape memory polymer which comprises a first hard segment and a second hard segment in addition to the soft segment, wherein the first hard segment has a lower melting point or glass transition temperature than the second hard segment. This may allow for the memorisation of two different shapes which can be reversibly moved between without the application of external mechanical forces. This may provide for still more versatile devices. The two-way shape memory polymer may be comprised of two multiblock copolymers which each have the same, or substantially the same soft segment glass transition temperature or melting point but different hard segment glass transition temperatures or melting points. Because both multiblock copolymers have the same soft segment glass transition temperature or melting point, the polymers are miscible in each other when the soft segments are melted. The resulting blend has three transition temperatures. The glass transition temperature or melting point of the second hard segment may be referred to as T-reset, the glass transition temperature or melting point of the first hard soft segment may be referred to at T-high and the glass transition temperature or melting point of the soft segment may be referred to as T-low.

Where a two-way shape memory polymer is used, a device such as that depicted by FIG. 16 may be formed from a straight fibre device by heating the fibre above T-reset, wrapping it around mould, such as a Teflon™ mould, and then cooling the fibre below T-low in order to set the fibre into the first spring configuration 1600. At this point, the Teflon™ mould may be removed and the first spring configuration 1600 will be maintained. If the fibre is then heated to a temperature above T-high but below T-reset, the fibre will deform into an intermediate shape which is part-way between the first spring configuration 1600 and a straight fibre, i.e. the fibre will deform into the second spring configuration 1601. On cooling of the fibre below T-low, the first spring configuration 1600 will be recovered. In this way, the first spring configuration 1600 and the second spring configuration 1601 can be moved between without the application of external mechanical forces by heating above T-high and cooling below T-low. The original straight fibre shape may then be recovered by heating the fibre above T-reset without the presence of the Teflon™ mould.

A device formed comprising a two-way shape memory polymer using the draw tower method may be particularly advantageous for forming a device comprising one or more hollow channels therein. In particular, it may be challenging to form a spring shaped fibre device comprising one or more channels which comprises a shape memory polymer. The resolution required for such a structure and the complexity involved may only be practically achievable by way of the draw apparatus method described here. A device having all of these properties may be particularly advantageous for a range of applications, such as for applications as soft actuators in soft robotics.

Figure 17:
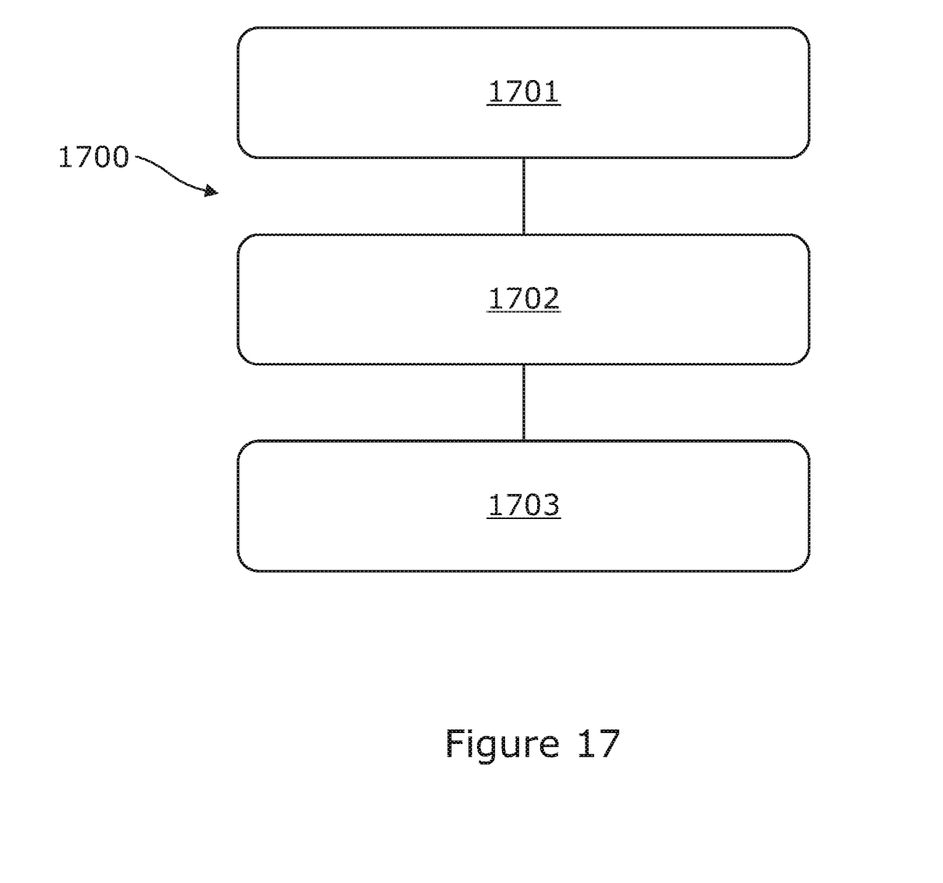
FIG. 17 shows a method according to the invention.

As shown in FIG. 17, the present invention comprises a method 1700 of manufacturing a device comprising at least a first fibre using a draw apparatus, the method comprising: providing 1701 a first preform comprising a shape memory polymer to the draw apparatus; heating 1702 a first portion of the first preform; and drawing 103, using the draw apparatus, the heated first portion in order to form the first fibre.

The invention claimed is:

1. A method of manufacturing a device comprising at least a first fibre using a draw apparatus, the method comprising:
providing a first preform comprising a shape memory polymer to the draw apparatus; heating a first portion of the first preform; and
drawing, using the draw apparatus, the heated first portion in order to form the first fibre,
wherein the first preform has a first hollow channel extending from a first end of the first preform in a draw direction at least partially through the first preform towards a second, opposing, end of the first preform, the draw direction comprising the direction in which the heated first portion is drawn using the draw apparatus; and
wherein the method further comprises:
providing a second preform comprising a shape memory polymer, the second preform having a receiving channel extending from the cross-sectional centre of a first end of the second preform in the draw direction at least partially through the second preform towards the cross-sectional centre of a second, opposing, end of the second preform, the receiving channel having a cross-sectional area at least equal to the cross-sectional area of the first preform such that the receiving channel is suitable for receiving the first preform within the receiving channel, the second preform further having at least a first hollow channel, different from the receiving channel, extending from one of the first end and the second end in the draw direction at least partially through the second preform towards the opposing end of the second preform;
heating a first portion of the second preform; and
drawing, using the draw apparatus, the heated first portion of the second preform in order to form a second fibre.

2. The method of claim 1, the first preform having at least a second hollow channel extending from the first end of the first preform in the draw direction at least partially through the first preform towards the second, opposing, end of the first preform.

3. The method of claim 1, wherein the step of drawing the heated first portion in order to form the first fibre further comprises rotating the first portion of the first preform around a draw axis with a first radial velocity such that a resultant first fibre comprises at least a first helical hollow channel, the draw apparatus comprising a first preform holder configured to hold and provide for rotation of the first preform.

4. The method of claim 1, further comprising the step of:
inserting the first preform into the receiving channel of the second preform prior to heating the first portion of the first preform and heating the first portion of the second preform;
wherein the steps of heating the first portion of the first preform and heating the first portion of the second preform are co-performed; and
wherein the steps of drawing, using the draw apparatus, the heated first portion of the first preform and drawing, using the draw apparatus, the heated first portion of the second preform are co-performed such that, during the step of drawing, the first and second fibres form together to provide the device, the draw apparatus comprising a second preform holder configured to hold the second preform and arranged to, in use, extend at least partially around one or both of the first preform holder and the first preform.

5. The method of claim 1, wherein the first preform and the second preform are drawn separately to form separate first and second fibres, the method further comprising the step of, after drawing the first and second fibres:
inserting the first fibre into the receiving channel of the second fibre; and
securing the first fibre inside the receiving channel of the second fibre.

6. The method of claim 3, wherein the step of drawing the heated second portion in order to form the second fibre further comprises rotating the first portion of the second preform around the draw axis with a second radial velocity, different to the first radial velocity, such that a resultant second fibre comprises a helical hollow channel and wherein the second preform holder is configured to provide for rotation of the second preform.

7. The method of claim 6, wherein (a) the first radial velocity has an opposite rotational direction to the second radial velocity and/or (b) the first radial velocity has a different magnitude to the second radial velocity.

8. The method of claim 2, further comprising the step of:
co-feeding one or more of: a steering tendon; an electrode; and an optical fibre through the first or at least second hollow channel of the first preform.

9. The method of claim 2, wherein the method further comprises, after forming the first fibre, the steps of:
forming a first hollow bridging channel in the first fibre between the first and second hollow channels at a first distance along the first fibre; and
sealing the first and second hollow channels of the first fibre beyond the first hollow bridging channel such that the first hollow channel, the second hollow channel and the first hollow bridging channel of the first fibre provide an interconnected flow channel for the flowing of water from the first hollow channel to the second hollow channel via the first hollow bridging channel of the second fibre.

10. The method of claim 1, the second preform having at least a second hollow channel extending from the same end of the second preform as the first hollow channel of the second preform extends from in the draw direction at least partially through the second preform towards the opposing end of the second preform, and wherein the method further comprises, after forming the second fibre, the steps of:
forming a first hollow bridging channel in the second fibre between the first and second hollow channels at a second distance along the second fibre; and
sealing the first and second hollow channels of the second fibre beyond the first hollow bridging channel such that the first hollow channel, the second hollow channel and the first hollow bridging channel of the second fibre provide an interconnected flow channel for the flowing of fluid from the first hollow channel to the second hollow channel via the first hollow bridging channel of the second fibre.

11. The method of claim 9, wherein one of the first and the second fibre further comprises at least a third hollow channel and a forth hollow channel resulting from third and fourth hollow channels in the corresponding first or second preform, wherein the method further comprises the steps of:
forming a second hollow bridging channel between the third and fourth hollow channels at a third distance along one of the first and second fibres, the third distance different to at least one of the first distance and the second distance; and
sealing the third and fourth hollow channels beyond the second hollow bridging channel such that the third hollow channel, the fourth hollow channel and the second hollow bridging channel provide a second interconnected flow channel having a different length to the first interconnected flow channel for the flowing of water from the third hollow channel to the fourth hollow channel via the second hollow bridging channel.

12. The method of claim 1, wherein the shape memory polymer comprises a two-way shape memory polymer.

13. The method of claim 1, further comprising a step of post-processing the first fibre to form the device.

14. The method of claim 13, wherein the post-processing step comprises one or more steps of:
- moulding the first fibre into a predetermined shape;
- connecting a wire extending through the first fibre to an electronic device;
- passing a tendon through one or more hollow channels extending through at least part of the first fibre; or
- attaching a connector to an end of a hollow channel extending through at least part of the first fibre.

15. The method of claim 1, wherein the device is a medical device.

16. The method of claim 15, wherein the medical device is for use in a magnetic resonance imaging system and wherein the medical device consists of non-magnetic materials.

17. The method of claim 1, wherein the first preform comprises a tip portion and a body portion, wherein one of the tip portion and the body portion comprise the shape memory polymer and the other of the tip portion and the body portion comprise a material suitable for drawing into a fibre other than a shape memory polymer.

* * * * *